United States Patent Office 3,373,348
Patented Mar. 12, 1968

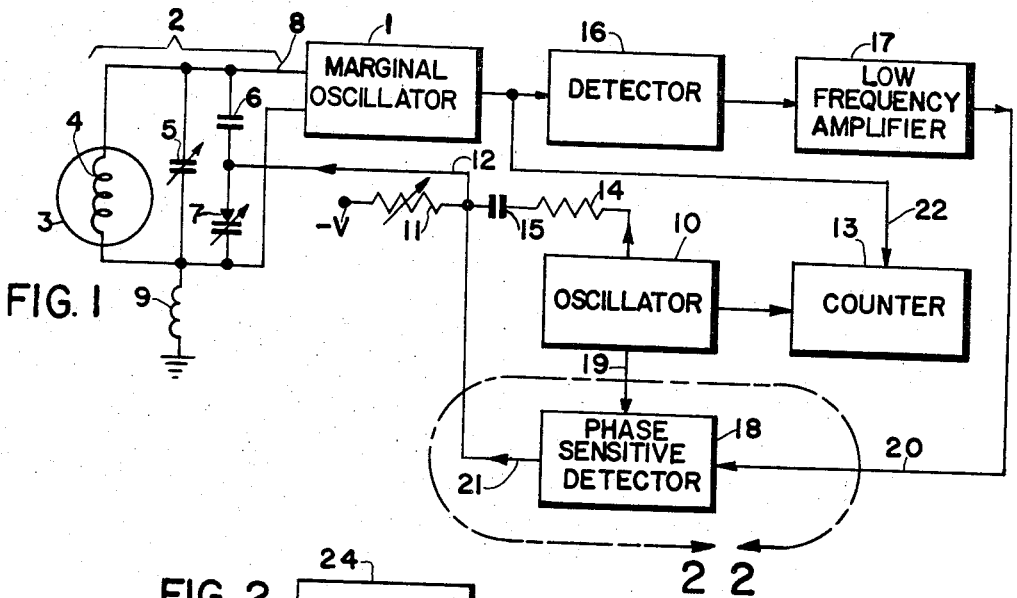
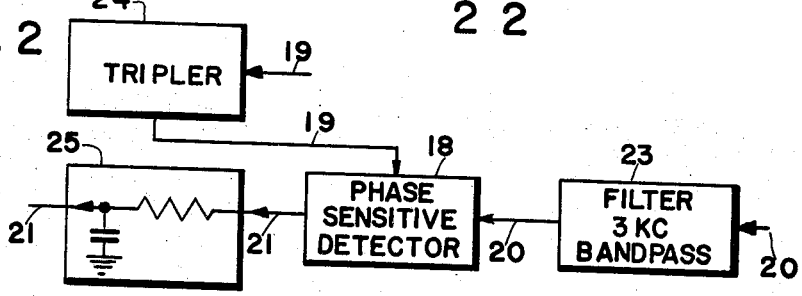
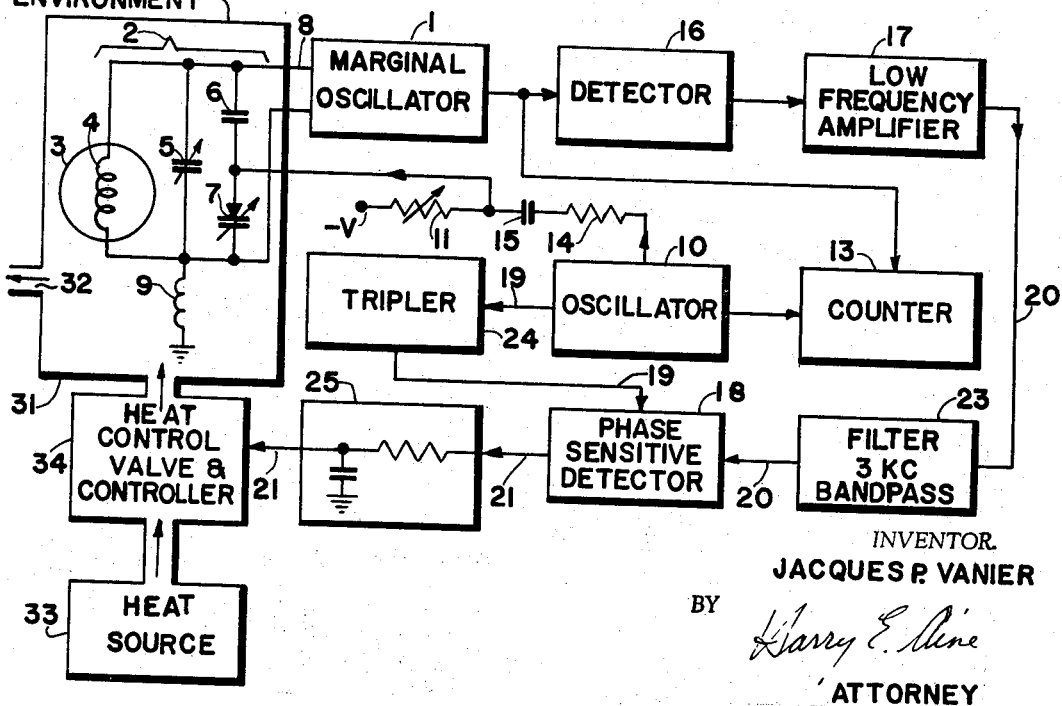

3,373,348
NUCLEAR QUADRUPOLE RESONANCE THERMOMETER AND/OR TEMPERATURE CONTROL
Jacques P. Vanier, Beverly, Mass., assignor to Varian Associates, Palo Alto, Calif., a corporation of California
Continuation of application Ser. No. 383,568, July 20, 1964. This application July 3, 1967, Ser. No. 651,046
10 Claims. (Cl. 324—.5)

This patent application is a continuation of patent application Ser. No. 383,568, filed on July 20, 1964, by the same inventor, now abandoned in favor of this application.

The present invention relates in general to nuclear quadrupole resonance thermometers and/or temperature controllers and more specifically to improved devices of this type wherein the frequency of the resonance detecting apparatus and the center frequency of the nuclear resonance line are automatically locked together by means of a feedback loop over wide variations with temperature. The feedback loop can serve to lock the frequency of the detecting apparatus to the fluctuating center frequency of the nuclear resonance line in case of the thermometer or can serve to lock the center frequency of the nuclear resonance line to a reference frequency in the detecting apparatus in the case of the temperature controller. These improved devices are especially useful for providing almost instantaneous temperature measurement or control over an extremely wide range of temperatures such as from 10° K. to 641° K. while obtaining unprecedented accuracies of thousandths of a degree K.

Heretofore nuclear quadrupole resonance thermometers have been built. Such a thermometer is described in my article titled, "Temperature Dependence of the Pure Nuclear Quadrupole Resonance Frequency in $KClO_3$," published in the Canadian Journal of Physics, vol. 38, p. 1397–1405 (1960).

The principal problem with the prior quadrupole thermometers has been that it was extremely tedious and time consuming to obtain a measurement of temperature because the frequency of the resonance signal had to be measured at a number of points on the resonance line as the sample was swept in frequency through resonance. This introduced certain errors that were cancelled by performing a similar set of measurements while sweeping through resonance from the other direction in frequency. A repetition of these measurements yielded data from which the center resonance frequency and thus temperature could be extracted.

In the present invention the reference frequency of the detecting apparatus and center of the quadrupole resonance line of the sensing sample are automatically locked together such that a substantially instantaneous and, if desired, continuous measurement or control of the temperature is obtained over a broad range of temperatures while obtaining temperature measurement or control of extreme accuracy.

The principal object of the present invention is the provision of an improved nuclear quadrupole resonance thermometer or temperature control.

One feature of the present invention is the provision of an automatic feedback loop from the output of the quadrupole resonance detecting apparatus to the frequency determinative elements of the detecting apparatus for causing the detecting apparatus to seek and detect the center resonance frequency of the sensing quadrupole sample whereby an accurate and substantially continuous and/or instantaneous measurement of the temperature may be obtained.

Another feature of the present invention is the provision of means for correlating the frequency measuring period with the frequency modulation cycle of the resonance detecting apparatus such that possible frequency measuring errors due to frequency modulation of the resonance signal are cancelled.

Another feature of the present invention is the provision of detecting and utilizing the third harmonic of the modulating frequency which appears in the detected resonance signal for deriving the feedback signal to cause the resonance detecting apparatus to seek the center of the resonance line whereby undesired frequency offsets are avoided in the measurement of the resonance signal.

Another feature of the present invention is the provision of a nuclear quadrupole resonance temperature control apparatus wherein the center resonance frequency of the nuclear quadrupole resonance sensing sample is brought into coincidence with a predetermined reference frequency of the detecting apparatus by means of a feedback signal from the output of the nuclear resonance detecting apparatus whereby extremely accurate temperature control is obtained over an extremely wide range of temperatures.

Other features and advantages of the present invention will become apparent upon a perusal of the following specification taken in connection with the accompanying drawings wherein:

FIG. 1 is a schematic circuit block diagram of a thermometer incorporating novel features of the present invention, FIG. 2 is an alternative circuit for a portion of the circuit of FIG. 1 delineated by lines 2—2 wherein the third harmonic of the detected resonance signal is used to derive the frequency control feedback signal, and FIG. 3 is a schematic block diagram of a temperature control circuit using the features of the present invention.

Referring now to FIG. 1, there is shown a circuit diagram of the nuclear quadrupole resonance thermometer apparatus of the present invention. Hereinafter "nuclear quadrupole resonance" will be abbreviated as "N.Q.R."

The circuit includes a conventional marginal oscillator 1 having a tank circuit 2 with a temperature sensing quadrupole resonance sample 3 such as potassium chlorate magnetically closely coupled to the R.F. magnetic fields of a coil 4 of the tank circuit 2. The coil 4 is parallel resonated with a capacitive network including a tunable capacitor 5 and a parallel branch containing a series connection of a fixed capacitance 6 and a voltage variable capacitor 7 such as a varactor diode. The tank circuit 2 is tuned to the quadrupole resonance frequency of the sample such as 28.5 mc. and is connected to the input of the marginal oscillator via lead 8 and to ground via R.F. choke 9.

A fixed D.C. bias voltage as of minus 9 volts is applied across the varactor diode 7 to ground from a source V via resistor 11 and lead 12. A varactor modulating voltage, at a suitable low frequency such as 1 kc., is applied across the varactor diode 7 from the gating circuit of a conventional frequency counter 13 such as Model 52436 manufactured by Hewlett-Packard, via resistor 14, coupling capacitor 15 and lead 12 for modulating the resonant frequency of the marginal oscillator 1 via frequency modulation of the tuned tank circuit 2. The gating circuit is nothing more than an oscillator which is shown for illustration as a separate device 10.

At nuclear resonance of the $Cl^{35}$ isotope of Cl within the sample the amplitude of the marginal oscillator signal is modulated at the 1 kc. frequency of the frequency modulation applied via varactor 7.

The amplitude modulation is extracted from the carrier of the marginal oscillator in detector 16 and applied to an audio or low frequency amplifier 17 wherein the signal is amplified and thence fed to one input terminal of a phase sensitive detector 18 via lead 20. Also, a sample of the modulation frequency is derived from the gating circuit of the counter 13 and fed to the other input terminal of the phase sensitive detector 18 via lead 19 where it is compared with the fundamental component of the amplitude modulation derived from amplifier 17. The output of the phase sensitive detector is a variable D.C. component of a proper phase and magnitude to feedback to the varactor diode 7 via leads 21 and 12 to center the resonant frequency of the tank circuit 2 at the center frequency of the quadrupole resonance line of the sensing sample 3. In this manner the frequency of the oscillations of the marginal oscillator 1 are locked or are tracked to the center of the N.Q.R. line which fluctuates in frequency in a predetermined manner with temperature.

The R.F. oscillations of the marginal oscillator 1 are then tapped off and fed to the input terminal of the counter 13 via lead 22 where they are counted to give a measure of the temperature sensed by the N.Q.R. of the sample 3. Note that the counter 13 is measuring the frequency of the marginal oscillator 1 as it is locked to the center frequency of the N.Q.R. of the sample 3. Note also that the marginal oscillator is being frequency modulated via the 1 kc. signal applied to the tank circuit 2 via varactor 7. A special feature of this circuit which permits very accurate measurement of the carrier frequency of the marginal oscillator, in spite of the frequency modulation impressed thereon, is the use of the counter gating signal, in this case at 1 kc., for performing the frequency modulation of the marginal oscillator 1. In this manner the frequency modulation cycle is correlated with the counting cycle or period of the counter 13 such that the period of the count is dimensioned to include an integral number of frequency modulation cycles such that the average frequency deviation during the count period is zero and thus no error is introduced by the frequency modulation.

The frequency counter 13 can be calibrated directly in units of temperature or frequency. It is easier from the equipment design standpoint to read out in units of frequency and convert to temperature directly by means of a graph of frequency versus temperature. With the circuit of FIG. 1 an almost instantaneous and continuous measurement of temperature to an accuracy of approximately ±0.001° K. is obtained over an extremely wide range of temperature from 10° K. to 641° K. using the $Cl^{35}$ isotope of the $KClO_3$ sample 3. Other suitable N.Q.R. samples include $NaClO_3$. Also, in a preferred embodiment the sample 3 is preferably shielded from stray extraneous magnetic fields by means of inserting the sample 3 within a high magnetically permeable container such as $\mu$-metal or moly permalloy.

Referring now to FIG. 2, there is shown an alternative circuit portion for that portion of the circuit of FIG. 1 delineated by line 2—2. In the circuit of FIG. 1 the feedback loop uses the fundamental component of the amplitude modulation of the N.Q.R. signal for locking the marginal oscillator to the center of the N.Q.R. line. This creates a problem because the fundamental component goes to zero at the center of the N.Q.R. line and furthermore the amplitude of the marginal oscillator oscillations is not constant with frequency but is slightly frequency dependent. Thus, the frequency modulation of the marginal oscillator 1, for finding the center of the resonance line, produces a slight fundamental amplitude modulation component which produces a slight frequency offset in the marginal oscillator from the exact center of the N.Q.R. line. This offset is troublesome because it is not constant but varies with frequency. The improved circuit of FIG. 2 uses the third harmonic amplitude modulation in the detected N.Q.R. signal (produced by frequency modulation of the marginal oscillator at the fundamental frequency of 1 kc.) for deriving the feedback signal to lock the marginal oscillator frequency to the center of the N.Q.R. line. The third harmonic component is especially desirable because it has a null at the center of the N.Q.R. line and there is no third harmonic interfering component produced by the aforementioned slight marginal oscillation amplitude change with frequency. Thus, the third harmonic feedback control system eliminates any possible frequency offset of the marginal oscillator from the exact center of the N.Q.R. line. The third harmonic control circuit of FIG. 2 includes a third harmonic band pass filter 23 which passes the third harmonic 3 kc. signal component derived from amplifier 17 to one input of the phase sensitive detector 18. The 1 kc. signal derived from the gating circuit of the counter is tripled by tripler 24 and fed as a reference into the other input terminal of the phase sensitive detector 18. The third harmonic phase sensitive detected output signal is then fed to low pass filter 25 and thence to the varactor 7 for locking the frequency of the marginal oscillator 1 to the center of the N.Q.R. line.

Referring now to FIG. 3, there is shown a typical temperature control circuit employing features of the present invention. The circuit of FIG. 3 is identical in many repects to the circuits of FIGS. 1 and 2 and the same numbers have been used to identify identical apparatus to that already described. In addition to the structure of FIGS. 1 and 2 there is provided a controlled environment such as an enclosure 31 within which it is desired to control temperature. The enclosure 31 contains or has affixed thereto in intimate thermal relation therewith the N.Q.R. temperature sensing sample 3 and has a heat leak at 32.

A source of heat 33 is connected to the enclosure 31 via the intermediary of a suitable heat control valve 34 which is responsive to signals supplied thereto from the output of low pass filter 25.

In operation the marginal oscillator is tuned to a predetermined reference frequency via coarse tuning capacitor 5 and D.C. varactor bias voltage which is set via variable resistor 11. The counter 13 reads out the frequency which corresponds to the desired temperature to which the enclosure 31 is to be controlled.

The third harmonic derived error signal from the output of the filter 25 controls the temperature of the enclosure 31 by letting in more or less heat from source 33 to bring the temperature and thus the center of the N.Q.R. line of the sample 3 to the center frequency of the tuned tank circuit of the marginal oscillator 1.

Since many changes could be made in the above construction of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A quadrupole reasonance temperature responsive apparatus including, means for producing and applying a characteristic reference frequency signal to a temperature sensitive quadrupole resonance material for exciting quadrupole resonance of the material, means for detecting the quadrupole resonance produced in the temperature sensitive quadrupole resonance material, means for deriving a feedback control signal from the detected resonance of the resonance material which varies in accordance with the difference between the reference frequency and the quadrupole resonance frequency, and means responsive to the feedback control signal for counteracting changes in frequency determinative resonance conditions which changes tend to increase the difference in frequency between said reference frequency of said resonance exciting means and the resonance frequency of the quadrupole resonance material.

2. The apparatus according to claim 1 wherein said temperature responsive apparatus is a thermometer and including means for counting the frequency of the characteristic reference frequency of said resonance exciting means for giving an output which is determinative of the temperature of said quadrupole resonance material.

3. The apparatus according to claim 2 wherein said feedback control signal changes the characteristic reference frequency of the exciting means to bring this frequency into coincidence with the frequency of the center of the resonance line of the quadrupole resonance material.

4. The apparatus according to claim 3 wherein said exciting means includes a marginal oscillator, and wherein said characteristic reference frequency is the average frequency of oscillation of said marginal oscillator.

5. The apparatus according to claim 1 wherein said means for deriving a feedback control signal includes means for modulating the resonance of the quadrupole resonance material to produce a detected harmonic resonance output signal of the modulating frequency, and a phase sensitive detector means comparing the same harmonic of the modulating frequency with said detected harmonic resonance output signal to thereby produce the feedback control signal.

6. The apparatus according to claim 2 including a gating circuit supplying a gating signal to said counter means for controlling the period of the counting cycle therein, and said gating circuit also supplying a modulating signal to said quadrupole resonance material for modulating resonance thereof at the gating frequency whereby the counting cycle of said counter is correlated with the modulation cycle of the quadrupole resonance material whereby errors in counting the frequency of the resonance of the quadrupole material due to the modulation are averaged out.

7. The apparatus according to claim 1 wherein said feedback control signal serves to control the temperature of an environment around said quadrupole resonance material to bring the resonance frequency of said material into coincidence with the characteristic reference frequency of said resonance exciting means.

8. The apparatus of claim 5 wherein said detected harmonic resonance output signal is at three times the modulating frequency, and including means for multiplying the modulating frequency by three to produce an output which is compared in said phase sensitive detector means with said harmonic resonance output signal, at three times the modulating frequency to produce the feedback control signal.

9. The apparatus of claim 3 wherein said means for deriving a feedback control signal includes means for modulating the resonance of the quadrupole resonance material to produce a detected harmonic resonance output signal at some integer multiple of the modulating frequency higher than one, and a phase sensitive detector means comparing the same harmonic of the modulating frequency with the same harmonic of the detected resonance output signal to produce the feedback control signal.

10. The apparatus of claim 9 including a gating circuit applying a gating signal to said counter means for controlling the period of the counting cycle therein, and said gating circuit also supplying a modulating signal to to said quadrupole resonance material for modulating resonance thereof at the gating frequency, whereby the counting cycle of said counter is correlated with the modulation cycle of the quadrupole resonance material whereby errors in counting the frequency of the resonance of the quadrupole material due to the modulation are averaged out.

References Cited
UNITED STATES PATENTS

| | | | |
|---|---|---|---|
| 2,536,111 | 1/1951 | Van Dyke | 73—362 |
| 2,731,564 | 1/1956 | Edlstein | 73—362 |
| 3,140,440 | 7/1964 | Senstad | 324—0.5 |
| 3,174,099 | 3/1965 | Larson | 324—0.5 |

OTHER REFERENCES

Budak, Istanbul Universiesi, Fen Falkullesi, Mecmusai, Seri. C.; Astronomic-Physique-Chemie, vol. 28, No. 3–4, July–October 1963, pp. 142–148.

Solov'ev, Instruments and Experimental Techniques, No. 2, November 1962, pp. 332–335.

Cowan and Tantilla, American Journal of Physics, September 1958, pp. 381–385.

RUDOLPH V. ROLINEC, *Primary Examiner.*

M. J. LYNCH, *Assistant Examiner.*